United States Patent [19]

Franchino et al.

[11] Patent Number: 5,198,068
[45] Date of Patent: Mar. 30, 1993

[54] PROCESS AND APPARATUS TO APPLY IDENTIFICATION INSCRIPTIONS ON SLEEVES MADE OF ELASTOMERIC MATERIAL IN THE MANUFACTURE OF DRIVING BELTS

[75] Inventors: Fulvio Franchino, Francavilla a Mare; Giovanni Alberti, Milan; Alessandro Pisoni, Pescara, all of Italy

[73] Assignee: Pirelli Trasmissioni Industriali S.p.A., Chieti, Italy

[21] Appl. No.: 792,876

[22] Filed: Nov. 21, 1991

[30] Foreign Application Priority Data

Nov. 21, 1990 [IT] Italy .................. 22121 A/90

[51] Int. Cl.[5] .................................. B44C 1/00
[52] U.S. Cl. .................................. 156/542; 156/137; 156/361; 156/541; 156/577
[58] Field of Search ............. 156/234, 238, 137, 361, 156/540, 541, 542, 577, 582

[56] References Cited

U.S. PATENT DOCUMENTS

| | | | |
|---|---|---|---|
| 3,580,772 | 5/1971 | Vergara | 156/240 |
| 4,105,483 | 8/1978 | Lin | 156/240 |
| 4,239,569 | 12/1980 | Harvey | 156/156 |
| 4,342,614 | 8/1982 | Vanden Bergh | 156/238 |
| 4,708,761 | 11/1987 | Taniguchi et al. | 156/516 |
| 4,936,941 | 6/1990 | Williams et al. | 156/353 |
| 4,972,772 | 11/1990 | Samejima et al. | 156/582 |
| 5,114,520 | 5/1992 | Wang, Jr. et al. | 156/234 |

Primary Examiner—Robert A. Dawson
Assistant Examiner—David Reifsnyder
Attorney, Agent, or Firm—Stevens, Davis, Miller & Mosher

[57] ABSTRACT

A sleeve (4) is fitted on a supporting table (3) to be positioned in front of a storage device (42) which carries a plurality of rolls (27) of first ribbon-like manufactured articles (25) contained in respective boxes (43). Each box has a transferable film (30) bearing identification inscriptions thereon, applied to a paper substrate (29). One of said manufactured articles (25) is unfolded and longitudinally extended on the sleeve (4) by a first grasping member (55) in order to be then cut by a cutting member (68) acting close to the box. A heated presser roller (32) longitudinally movable on the ribbon-like-manufactured article (25) causes the transferring of the film (30) to the sleeve (4). Simultaneously, the application of the film (30) belonging to a second ribbon-like manufactured article (26) is carried out, said second manufactured article (26) being supported by a main carriage (33) carrying the presser roller (32) and engaging with a positioning roller (73) unfolding the manufactured article on the sleeve (4) before the presser roller (32)

14 Claims, 5 Drawing Sheets

PROCESS AND APPARATUS TO APPLY IDENTIFICATION INSCRIPTIONS ON SLEEVES MADE OF ELASTOMERIC MATERIAL IN THE MANUFACTURE OF DRIVING BELTS

CROSS REFERENCE TO RELATED APPLICATIONS

Copending U.S. application Ser. No. 07/793731, filed on even date herewith and corresponding to:

Italian Application 22 123 A/90, filed Nov. 21, 1990 for PROCESS AND APPARATUS FOR HANDLING DRIVING BELTS IN AN AUTOMATED MANNER.

Copending U.S. application Ser. No. 07/793840, filed on even date herewith and corresponding to:

Italian Application 22 124 A/90, filed Nov. 21, 1990 for MACHINE AND PROCESS FOR COILING AND WINDING TUBULAR SLEEVES OF ELASTOMERIC MATERIAL INCORPORATING REINFORCING FIBERS.

Copending U.S. application Ser. No. 07/793732, filed on even date herewith and corresponding to:

Italian Application 22 125 A/90, filed Nov. 21, 1990 for PROCESS AND APPARATUS FOR THE INSPECTING JUNCTIONS IN SLEEVE LINING FABRICS FOR THE MANUFACTURE OF TOOTHED BELTS.

Copending U.S. application Ser. No. 07/793733, filed on even date herewith and corresponding to:

Italian Application 22 126 A/90, filed Nov. 21, 1990 for PROCESS AND APPARATUS TO IDENTIFY THE PRESENCE OF STRUCTURAL CAVITIES IN SLEEVES FOR THE MANUFACTURE OF DRIVING BELTS.

Copending U.S. application Ser. No. 07/742880, filed on even date herewith and corresponding to:

Italian Application 22 127 A/90, filed Nov. 21, 1990 for PROCESS AND AUTOMATIC INSTALLATION FOR THE CONTROL OF THE QUALITY AND OF THE PRODUCTION OF TRANSMISSION BELTS.

Copending U.S. application Ser. No. 07/793729, filed on even date herewith and corresponding to:

Italian Application 22 128 A/90, filed Nov. 21, 1990 for A PROCESS AND APPARATUS FOR INSPECTING THE GEOMETRICAL CONFIGURATION OF TOOTHED DRIVING ELEMENTS.

The disclosure of each of the above identified U.S. and corresponding Italian Applications are hereby incorporated by reference.

BACKGROUND OF THE INVENTION

The present invention relates to a process and an apparatus to apply identification inscriptions on sleeves made of elastomeric material in the production of driving belts.

It is known that in the production of driving belts in general the formation of an axially elongated substantially cylindrical sleeve of elastomeric material incorporating textile reinforcement structures is first provided. This sleeve will be subsequently circumferentially slit at a plurality of axially spaced cuts so as to obtain a number of belts of predetermined width.

However, before said slitting operation the sleeve will be submitted to a marking step in which wordings and inscriptions designed to appear on each of the finished belts are applied to the outer surface thereof, so that said belts may be easily distinguishable from the different types of produced and marketed belts.

In greater detail, usually inscriptions printed on the sleeve give indications relative for example to the brand, model and sizes of the belt, as well as the production date or period of the belt itself.

It will be easily understood that indications relative to the belt brand and type, as well as to size features, are indispensable so that the different types of belt produced may be distinguished from one another in an easy and sure manner.

Indications relative to the production date and period can instead be useful for example when a given lot of belt needs to be withdrawn from the market for example due to defects found out in use, in the belts produced in a particular period.

Currently known methods adapted to apply inscriptions on sleeves are fundamentally based on silk-screen processes.

These processes are necessarily carried out in a substantially manual manner and involve an important waste of time and man-power.

Actually the operator must suitably position a serigraphy stencil on the sleeve being worked in order to subsequently coat a paint layer on the stencil itself. This paint, passing through suitably arranged pervious areas on the serigraphy stencil, will deposit on the sleeve thereby forming the desired inscriptions.

It is to be noted that not only the above silk-screen methods involve important working costs, but also bring about problems related to ecology and health. In fact the unavoidably ejected amounts of paints and solvents are highly polluting.

In addition, these paints and solvents release important amounts of volatile substances which can be injurious to the health of workers carrying out the operation.

SUMMARY OF THE INVENTION

The main object of the present invention is substantially to solve the problems of the known art by a process and an apparatus enabling inscriptions to be applied to sleeves in a very quick and easy manner, without involving the release of toxic substances in the air and/or the ejection of polluting substances.

Another important object of the invention is to provide a process and an apparatus adapted to operate in a completely automated manner.

The foregoing and further objects that will become more apparent in the course of the following description are substantially attained by a process to apply identification inscriptions on sleeves made of elastomeric material for the production of driving belts, characterized in that it comprises the following steps:

fitting a sleeve on a supporting board;
longitudinally disposing on the sleeve at least a ribbon-like manufactured article having a paper substrate to which a transferable film carrying said identification inscriptions is applied, said transferable film being oriented towards the sleeve itself;
pressing and heating the ribbon-like manufactured article on the sleeve so as to cause the transferring of the transferable film to the sleeve surface and the simultaneous detachment of the paper substrate from said film.

Still in accordance with the present invention, the process in question is put into practice by an apparatus to apply identification inscriptions to sleeves made of elastomeric material for the production of driving belts, characterized in that it comprises:
- a guide and support framework;
- a supporting board connected to said framework and arranged to sustain a sleeve longitudinally fitted on the board;
- set up means acting on at least a ribbon-like manufactured article wound in the form of a roll so as to longitudinally unfold and extend the manufactured article on the sleeve, said manufactured article having a paper substrate to which a transferable film is applied, said film being oriented towards the sleeve and carrying said identification inscriptions;
- a main carriage slidably guided by the framework and longitudinally movable on the sleeve fitted on the supporting board;
- a heated presser roller rotatably supported by the main carriage according to an axis at right angles to the longitudinal axis of the sleeve and acting by a thrust action on the ribbon-like article unfolded on the sleeve so that, following a going stroke carried out by the main carriage, said roller causes the transferring of said transferable film onto the sleeve surface and the simultaneous detachment of the paper substrate from the film.

BRIEF DESCRIPTION OF THE DRAWINGS

Further features and advantages of the invention will best be understood from the detailed description of a preferred embodiment of a process and an apparatus to apply identification inscriptions to sleeves of elastomeric material for the production of driving belts in accordance with the present invention, given hereinafter by way of non-limiting example with reference to the accompanying drawings, in which.

DETAILED DESCRIPTION OF A PREFERRED EMBODIMENT

Figure 1:
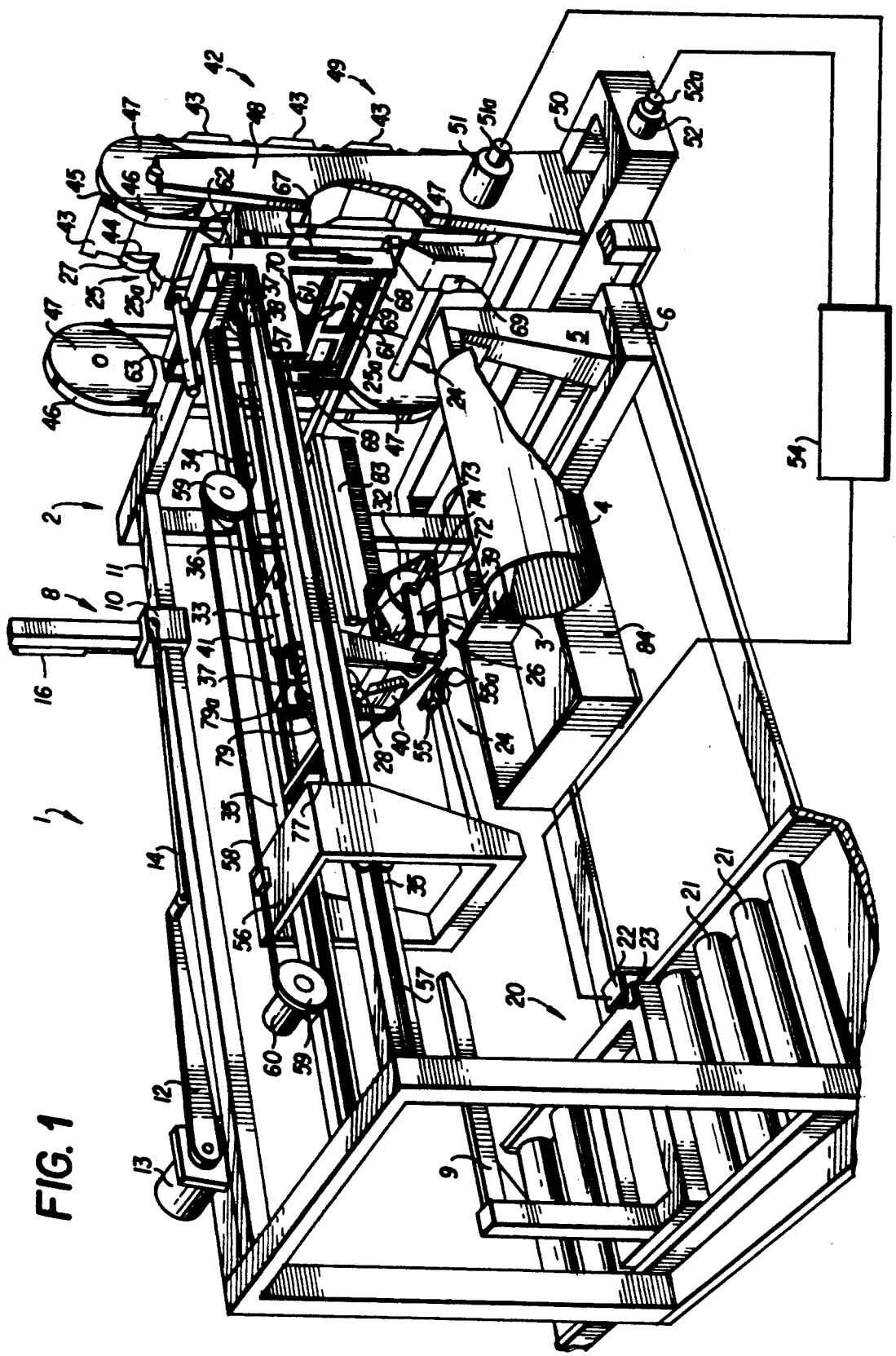
FIG. 1 is a partly broken perspective view of an apparatus to apply identification inscriptions to sleeves of elastomeric material in accordance with the process of the invention.

Referring to the drawings, an apparatus to apply identification inscriptions to sleeves of elastomeric material for the production of driving belts in accordance with the present invention has been generally identified by reference numeral 1.

Apparatus 1 is designed to put into practice a process that, in accordance with the present invention, comprises the following steps:
- fitting a sleeve on a supporting board;
- longitudinally disposing on the sleeve at least a ribbon-like manufactured article having a paper substrate to which a transferable film carrying said identification inscriptions is applied, said transferable film being oriented towards the sleeve itself;
- pressing and heating the ribbon-like manufactured article on the sleeve so as to cause the transferring of the transferable film to the sleeve surface and the simultaneous detachment of the paper substrate from said film.

For the purpose apparatus 1 comprises a guide and support framework generally denoted by 2, to the base of which a supporting board 3 is located which is arranged to bear a sleeve 4 made of elastomeric material on which the desired identification inscriptions will have to be affixed, said inscriptions being designed to appear on each of the belts that, as is known, will be obtained from a plurality of axially spaced cuts made by a subsequent circumferential slitting operation carried out on the sleeve.

The supporting board 3 extends in cantilevered fashion from a post 5 slidably movable along transverse guides 6 to bring the board from a loading-unloading position in which the engagement between the sleeve 4 and the board itself takes place, to a work position in which inscriptions are applied to the sleeve 4. Preferably, the engagement between the sleeve 4 and the supporting board 3 occurs upon the action of a transferring member 8 designed to pick up the sleeve from a handling support 9 and longitudinally fit it onto the board which is disposed in its loading-unloading position.

The handling support 9 belongs to the conventional types usually adopted for enabling an easy displacement of the sleeve 4 between the various apparatus adapted for the execution thereon of the different workings necessary to manufacture driving belts.

In the embodiment shown the handling support 9 is disposed in a pause station 20 comprising a number of power-driven rollers 21 by which the support is brought to a predetermined position where it will stay until the end of the sleeve working step on the part of apparatus 1.

The pause station 20 is also provided with a reading member 22 that, in known manner, will act, for the purposes better clarified in the following, on a magnetic card 23 carried by the handling support 9 and in which information relating to some features proper to the sleeve 4 carried by the handling support is stored.

The stored features may for example comprise names of companies for which the belts to be obtained from the sleeve 4 are designed, pattern and/or size characteristics of said belts and so on.

The transferring member 8 is essentially comprised of a supporting block 10 slidably engaged on a longitudinal member 11 belonging to the framework 2 and movable upon command of a crank 12 operated by a rotary actuator 13 and acting on a connecting rod 14 linked to the block.

Connected to the block 10 is a grasping member, for example of the mechanical or pneumatic type (not shown as it can be of any known type) which is movable in a vertical direction.

The transferring member 8 is first brought over the handling support 8 so that it can pick up the sleeve 4. The sleeve is raised and, due to the movement of the whole transferring member 8 on the longitudinal member 11, it will be fitted on the supporting board 3.

The supporting board 3 and the sleeve 4 are then brought to the work position by the displacement of the Post 5 along the transverse guides 6.

When the sleeve has reached its work position, the set up means 24 is operated and it acts so as to longitudinally unfold at least a ribbon-like manufactured article 25, 26 previously in the form of a roll 27, 28, on the sleeve 4.

The ribbon-like manufactured article 25, 26 is essentially comprised of a paper substrate 29 to which a transferable film 30 which is oriented towards the sleeve 4 is applied and on which the identification inscriptions to be affixed to the sleeve are reproduced.

Optionally the presence of a protective paper layer 31 covering the paper substrate 29 may also be provided so that when the ribbon-like manufactured article 25, 26 is wound in the form of a roll 27, 28 the adhering of the film 30 belonging to one of the coils formed by the manufactured article itself to the back of the paper substrate 29 belonging to the next coil is prevented.

In accordance with a preferred embodiment, unfolded on the sleeve is a first ribbon-like manufactured article 25 carrying a film 30 reproducing indications relating for example to the brand and the type and sizes of the belts to be produced from the sleeve 3 being worked, and a second ribbon-like manufactured article 26 carrying a film 30 reproducing, on the contrary, indications relating for example to the belt manufacturing date or period.

The ribbon-like manufactured article or articles 25, 26 longitudinally unfolded on the sleeve 4 are submitted to the action of a heated presser roller 32, rotatably supported by a main carriage 33 which is slidably guided between two first guide rails 34 extending along the inner sides of two longitudinal members 35 carried by the framework 2 at the upper part thereof.

The main carriage 33 is movable parallel to the axis of the sleeve 4 upon command of one toothed belt 36 passing over respective idler pulleys 37 driven in rotation by a first motor 38.

In greater detail the presser roller 32, heated to a suitable temperature by electric resistors housed within it and not shown as known an conventional, is rotatably supported on an axis perpendicular to the longitudinal axis of sleeve 4, by a fork-shaped element 39 fastened to a lifting lever 40 oscillatably linked to the carriage 33 on an axis parallel to the axis of said roller.

Figure 4:
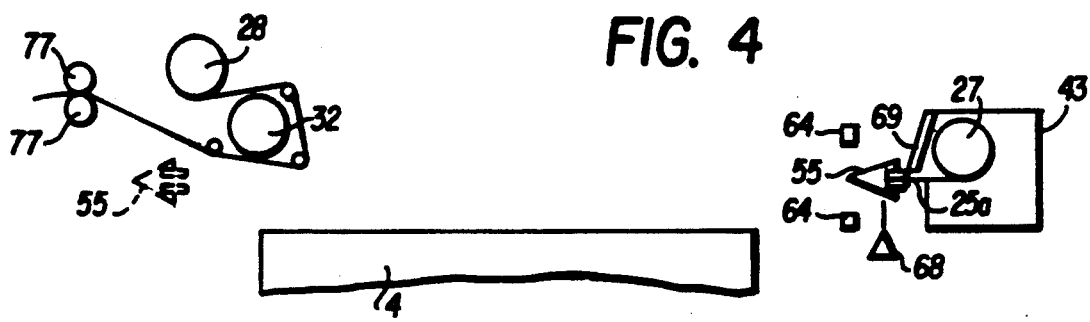
FIGS. 4 to 10 are diagrammatic side views showing different operating steps carried out by the apparatus for applying inscriptions to the sleeve.
Figure 8:
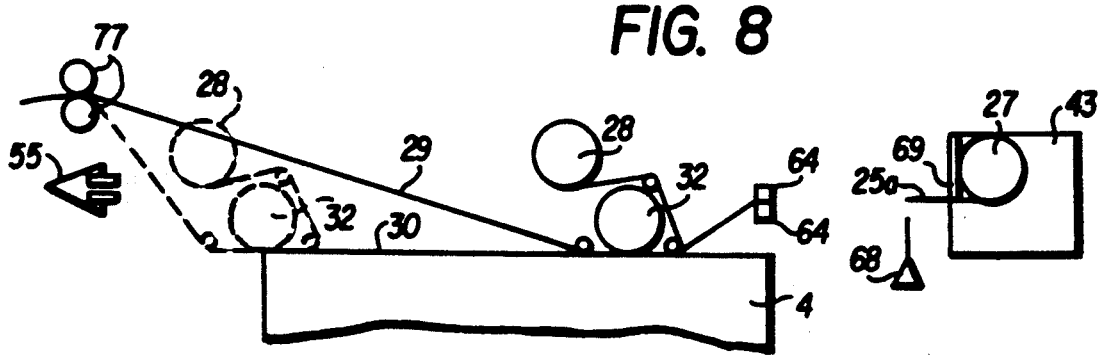

The lifting lever 40 is movable upon command of a fluid-operated lifting actuator 41 fastened to the main carriage 33, so as to bring the presser roller 32 from a rest condition in which, as shown in FIG. 4, it is raised relative to the sleeve 4, to a working position in which, as shown in FIG. 8, it acts by thrust on the ribbon-like manufactured articles 25, 26 interposed between the sleeve and the roller so as to exert a pressure adjusted by the lifting actuator 41.

Figure 9:
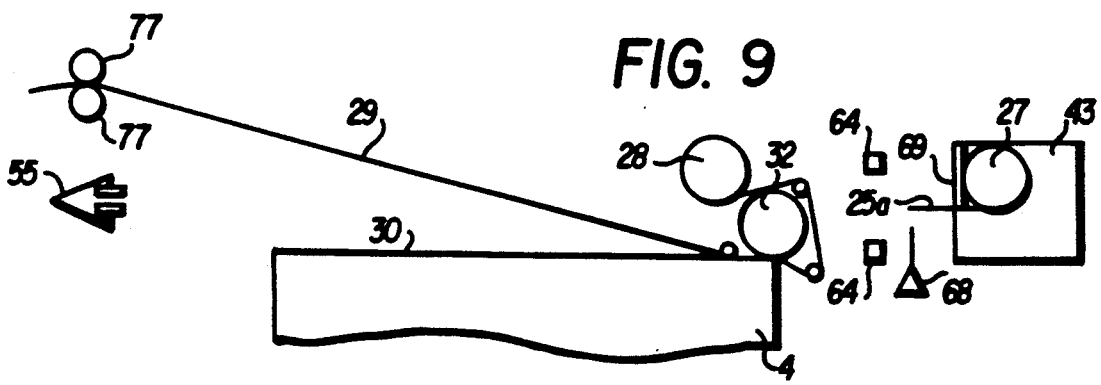
Figure 10:
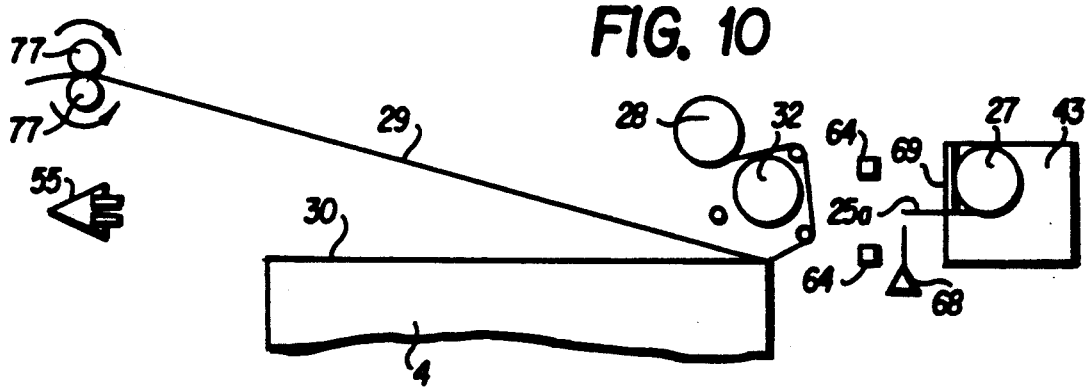

As shown in FIGS. 8 and 9, the presser roller 32 in its working position can be lowered onto the ribbon-like manufactured articles 25, 26 so that it may be longitudinally moved on the sleeve 4 by the displacement of the main carriage 33.

During this step, by effect of the combined action including heating, pressure exerted by roller 32 and advancing of the roller itself to a given speed, the film 30 is transferred onto the sleeve 4 and simultaneously the paper substrate 29 and the protective layer 31 are separated from the film itself.

In greater detail, it is to be noted that under the combined heating-pressure action a molecular bond is created between the film 30, made of synthetic material and preferably elastomeric material, and the elastomeric material of the sleeve 4, which results in the separation of the film from the paper substrate 29 to which the film is originally engaged by mere adhesion.

A good adhesion of the film 30 is correlated to the temperature and advancing speed values of the presser roller 32, as well as to the pressure exerted on sleeve 4 by the latter. It has been found that the surface temperature of roller 32 should preferably have a value in the range of 230° C. to 270° C.

Lower or higher temperature values than those included in the above range would give rise to an imperfect adhesion of the film 30 to the sleeve 4 and the risk of producing burnings on the film and/or the sleeve 4 during the application, respectively. The best results have been achieved at temperatures in the order of 250° C.

Pressure exerted by the roller 32 preferably has a value in the range of 3 to 7 bar.

Pressure values lower than 3 bar would give rise to an imperfect and irregular application of the film 30 to the sleeve 4.

Pressure values higher than 7 bar could cause permanent deformations to the sleeve 4 and in addition would result in the roller having a too high advancing speed so that the precise positioning of the films 30 onto the sleeve is not ensured.

The best results are achieved by adopting a pressure of 6 bar.

The advancing speed of roller 32 preferably has a value ranging between 1.5 m/min and 4 m/min. Lower speeds as compared with the above values would involve a reduced productivity and the risk of burning the films 30 and/or the sleeve 4. Higher speeds would on the contrary bring about an imperfect adhesion of the films 30 to the sleeve 4, as well as an imprecise positioning of the applied films.

The best results have been achieved by applying an advancing speed of two meters per minute.

It is to be noted, as on the other hand can be clearly understood from the foregoing, that the inscriptions reproduced on the film 30 of the first ribbon-like manufactured article 25 are closely correlated with the type of sleeve being worked.

Therefore provision is made for a plurality of first ribbon-like manufactured articles 25 carrying inscriptions and wordings which are different from one another and designed to be individually and selectively used depending upon the type of sleeve which is fitted on the supporting board 3.

For the purpose, said set up means 24 comprises a storage device 42 having a plurality of container boxes 43 each accommodating a roll 27 consisting of one of the first ribbon-like manufactured articles 25.

Figure 2:
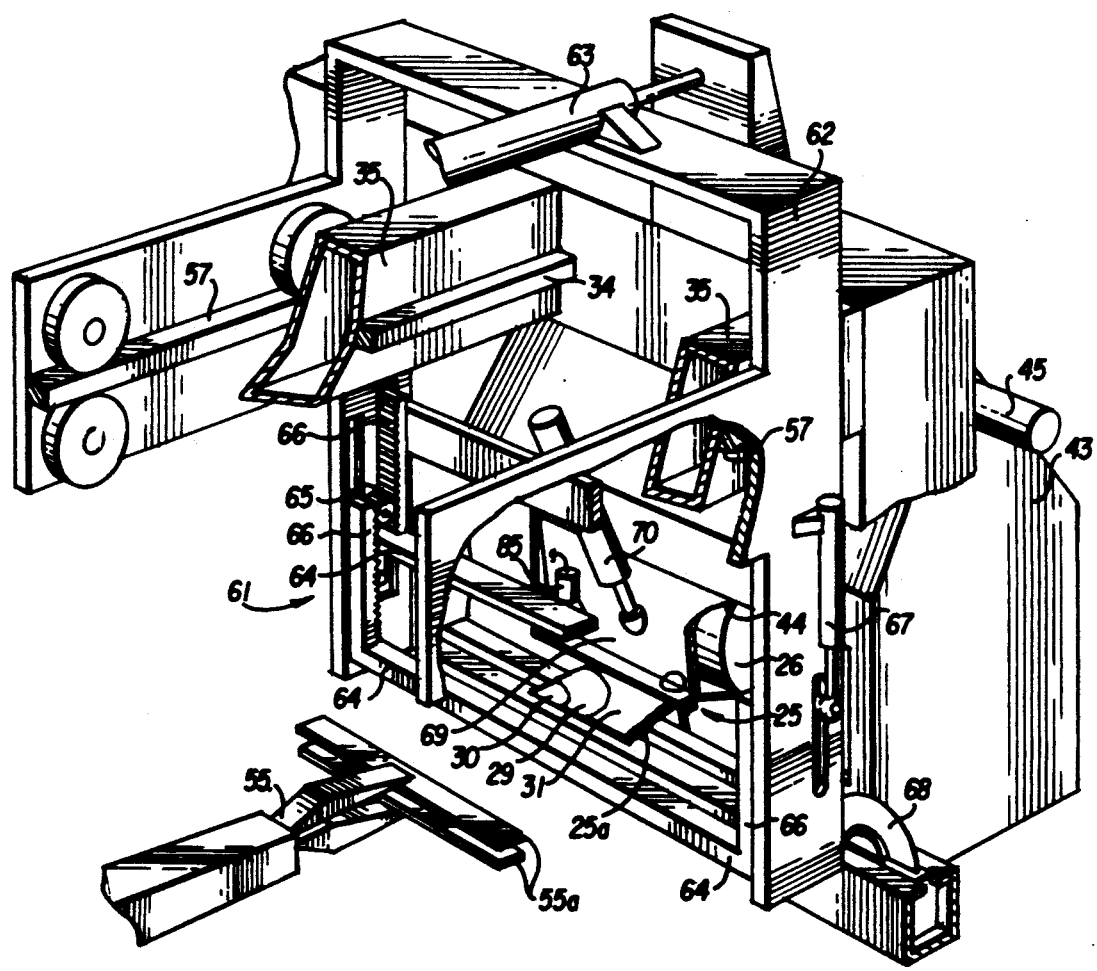
FIG. 2 is a broken perspective view, to an enlarged scale relative to FIG. 1, of a detail of the apparatus in question.
Figure 3:
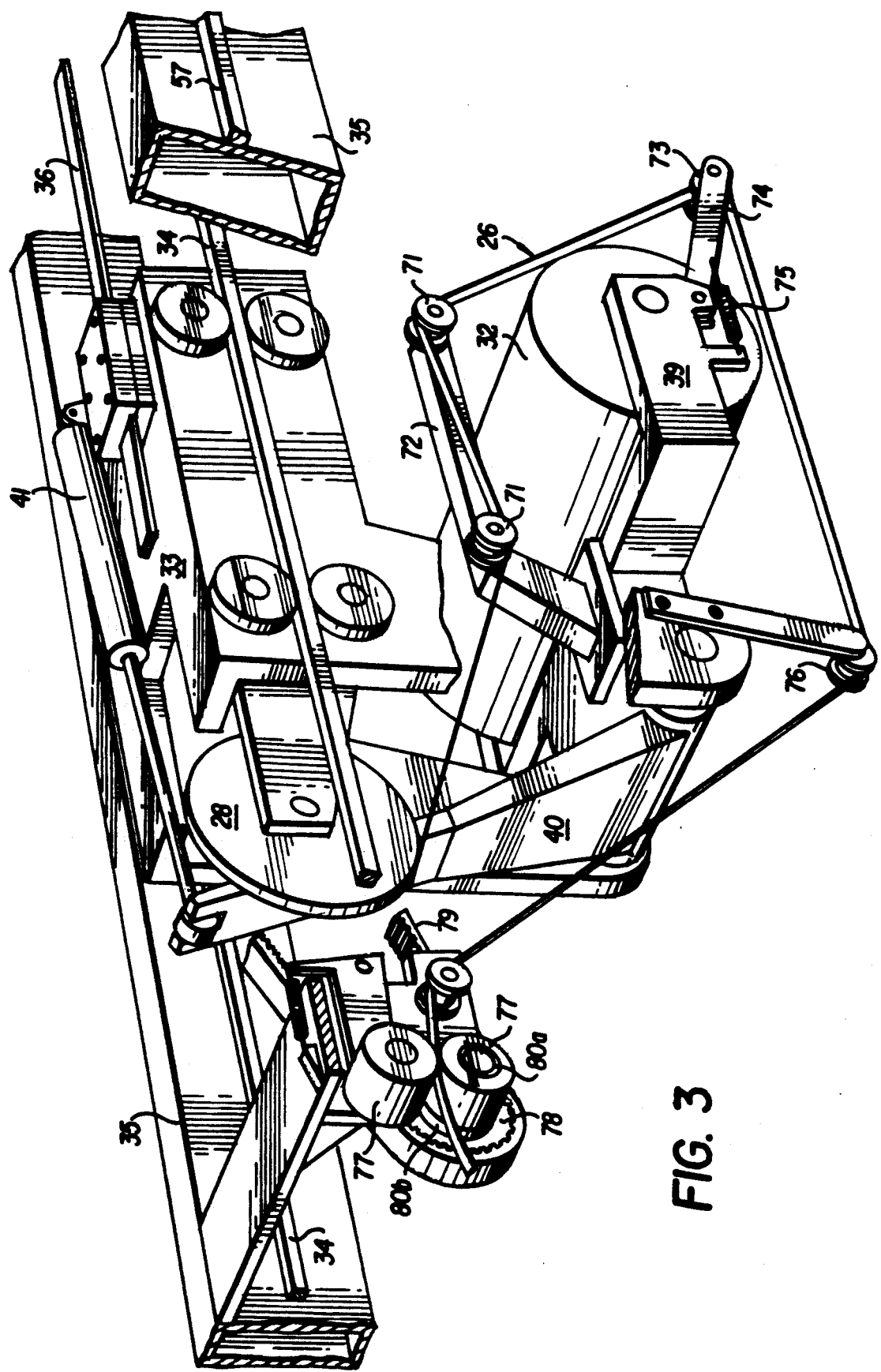
FIG. 3 is a broken perspective view, to an enlarged scale relative to FIG. 1, showing another detail of the apparatus in question.

As clearly viewed in FIG. 2, the first ribbon-like manufactured article 25 of each box 43 has one unwinding portion 25a projecting towards the sleeve 4, through an opening in the box itself.

The container boxes 43 are disposed in alignment on several horizontal rows mutually superposed and spaced apart from each other by the same distance.

Each box row is oscillatably linked by means of pivot pins 45 carried on top at the opposite ends of the row itself, to a pair of handling tracks each operatively engaged about a pair of driving wheels 47 aligned in a substantially vertical direction.

The driving wheels 47 are rotatably supported by a pair of uprights 48 being part of the movable framework 49, for example along a guide base 50, at right angles to the longitudinal extension of the sleeve 4.

A vertical handling actuator 51 and a horizontal handling actuator 52 respectively act on at least one of the driving wheels 47 and the framework 49 to move the container boxes 43 in a vertical direction and in a horizontal direction. The handling actuators 51, 52, not described in detail as known per se and conventional, are controlled by respective encoders 51a, 52b interlocked to an electronic control unit 54, also not described in detail as not of importance to the ends of the invention, on which the operating management of the whole apparatus 1 rely. The electronic control unit 54 is connected to the reading member 22 so as to control the actuators 51 and 52 based on the information detected by the reading member on the magnetic card 23.

More precisely, the electronic control unit 54 compares the information transmitted by the reading member 22 with those stored in it and, after having verified that data correspond, drives the displacement of boxes 43 and framework 49 so that the box 43 containing the ribbon-like manufactured article 25 adapted for that particular sleeve is brought into alignment with the sleeve 4 being worked.

The set up means 24 also provides for the presence of a first grasping member 55 having a pair of biting elements 55a movable close to each other in known and conventional manner, and operatively supported by an auxiliary carriage 56 longitudinally movable over the sleeve 4 according to a stroke of higher amplitude than the sleeve length.

In greater detail, the auxiliary carriage 56 is slidably engaged on second guide rails 57 that, in the embodiment shown, are fastened to the outer sides of the longitudinal members 35 engaging the first guide rails 34 for the movement of the main carriage 33. As can be viewed from FIG. 1, the first auxiliary carriage 56 is so structured that it can be freely crossed by the main carriage 33 having the presser roller 32 in the raised position, without any possibility of mechanical interference.

The movement of the first auxiliary carriage 56 is driven by a second toothed belt 58 passing over respective idler pulleys 59 operable in rotation by a second motor 60 linked to one of the longitudinal members 35.

The grasping member 55 cooperates, for the purpose of positioning the first ribbon-like manufactured article 25 on the sleeve 4, with a second grasping member 61 acting between the sleeve and the containing box 43 in alignment with the latter so as to suitably hold the ribbon-like manufactured article which has been unfolded on the sleeve by the first grasping member 55, as more clearly shown in the following.

The second grasping member 61 is operatively supported by a second auxiliary carriage 62 slidably guided along the previously mentioned second rails 57.

Figure 5:
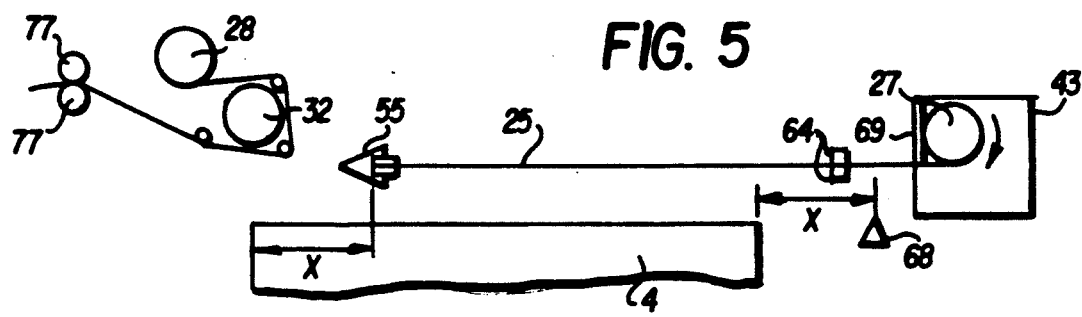
Figure 6:
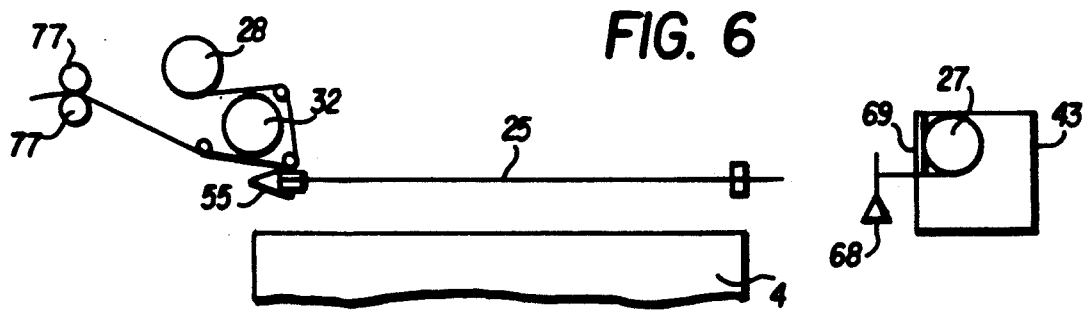
Figure 7:
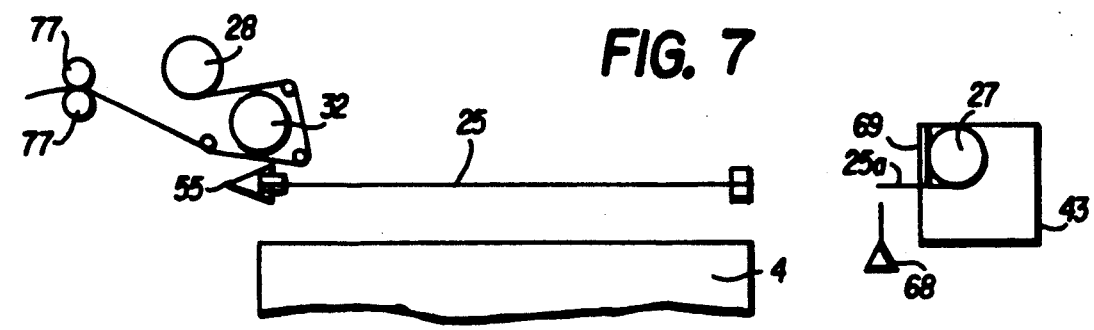

A fluid-operated handling actuator 63 acts between the second auxiliary carriage 62 and the framework 2 to move the second grasping member 61 parallel to the longitudinal axis of the sleeve 4, from a first working position in which it is slightly spaced apart from the sleeve 4 (FIGS. 4, 5, 9 and 10) to a second working position in which it is located close to the sleeve, substantially over the end thereof (FIGS. 6, 7 and 8).

The second grasping member 61 is preferably comprised of a pair of closing bars 64 interconnected to each other by a pinion gear 65 meshing with two opposite rack rods 66 extending perpendicularly from one of the closing bars, respectively.

A fluid-operated closure actuator 67 acts between the second auxiliary carriage 62 and one of the closing bars 64 to move the bars close to and apart from each other.

Also acting in the space included between the containing box 43 and the sleeve 4 is a cutting member 68 movable at right angles to the longitudinal extension of the sleeve in order to cut the first ribbon-like manufacture article 25.

The action of the cutting member 68 is assisted by the holding action exerted on the ribbon-like manufactured article 25 by the second grasping member 61 as well as by a closure partition 69 oscillatably linked to the box 43 at the opening 44 of the latter.

The closure partition 69 is submitted to a thrust action upon command of a fluid-operated thrust cylinder 70 fastened to the second auxiliary carriage 62 in order to hold the ribbon-like manufactured article 25 against an opening edge, so that the manufactured article is suitably tensioned in the working area of the cutting member 68.

The unfolding of the first ribbon-like manufactured article 25 on the sleeve 4 takes place as follows.

The first auxiliary carriage 56 is moved, being preferably previously enabled, by a photoelectric cell 85 controlling the presence of the unwinding portion 25a at the outside of the corresponding containing box 43, so as to displace the first grasping member 55 towards the storage device 42.

During this step the first grasping member 55 passes through the biting bars 64 mutually spaced apart from each other, in order to engage the unwinding portion 25a of the first manufactured article 25.

Then the first auxiliary carriage 56 is again moved backward on the respective guide rails 57 in order to cause the ribbon-like manufactured article 25 held by the first grasping member 55 to be unwound from the corresponding roll 27 and longitudinally laid down on the sleeve 4.

The backward movement of the second auxiliary carriage 56 is stopped, for example upon command of photoelectric cells mounted on the longitudinal members 35, when the end of the ribbon-like manufactured article 25 engaged by the first grasping member 55 reaches a predetermined distance "x" from the corresponding end of the sleeve 4, as shown in FIG. 5.

The above distance "x" substantially corresponds to the distance intervening between the cutting member 68 and the sleeve end turned towards the storage device 42.

At this point the biting bars 64 of the second grasping member 61 are moved close to each other and simultaneously the thrust cylinder 70 is operated so that the ribbon-like manufactured art 25 may be held and tensioned over its portion comprised between the second grasping member 61 and the closure partition 69.

Then the cutting member 68 is operated and it transversely cuts the ribbon-like manufactured article 25.

After the cut, the grasping members 55 and 61 are simultaneously moved away from the storage device 42 in order to dispose the cut ribbon-like manufactured article 25 with its opposite ends in register with the sleeve ends.

More precisely, as can be seen by comparing FIGS. 5, 6 and 7, the second grasping member 61 is stopped at its second working position, exactly over the corresponding end of the sleeve 4.

Under this situation, the first grasping member 55 has not yet reached the corresponding end of the sleeve 4 and therefore goes on in its stroke dragging along the ribbon-like manufactured article 25 the cut end of which initially projecting from the second grasping member 61 will be subjected to travelling between the closing bars 64 as far as it will stop exactly flush with said bars.

In order to facilitate the sliding of the ribbon-like manufactured article 25 between the closing bars 64 the feed pressure of the fluid-operated actuator 67 associated with the second grasping member 61 may be suitably reduced. However said feed pressure will always have a value sufficient to prevent the ribbon-like manufactured article 26 from spontaneously disengaging from the second grasping member 61.

Once the opposite ends of the ribbon-like manufactured article 25 have been brought in register with the sleeve ends, the manufactured article is disengaged from the first grasping member 55 which will move backward past the sleeve 4 to enable the presser roller 32 to be lowered to the operating condition, as shown by dotted line in FIG. 8.

Through the movement of the main carriage 33, the presser roller 32 is then moved towards the storage device 42 in order to cause the application of the film 30 to the sleeve 4, while the first ribbon-like manufactured article 25 is being held in position by the second grasping member 61.

When, as shown in FIG. 8, the presser roller 32 comes close to the second grasping member 61, the latter will definitively release the ribbon-like manufactured article 6 and move away from the sleeve 4 thereby enabling the roller to complete the application of the film 30 to the sleeve 4.

As regards the second manufactured article 26, it is to be pointed out that the inscriptions reproduced on the film 30 thereof, for example relating to the manufacture date and period of the sleeve and belts obtained therefrom, can be universally adopted for any type of sleeve being worked.

Therefore the set up means 24 provides for the roll 28 formed with the second ribbon-like manufactured article 26 to be rotatably supported by the main carriage 33.

The unwinding portion of the manufactured article 26 is engaged on guide rollers 71 rotatably supported by a bracket 72 fastened to the lifting lever 40 and will subsequently engage about a positioning roller 73 connected to the main carriage 33.

In greater detail, the positioning roller 73 is rotatably supported by the end of a swinging arm 74 the opposite end of which is mounted to the fork-shaped element 39 supporting the presser roller 32.

The positioning roller 73 is constantly urged downwardly, preferably by a preloading spring 75 acting between the swinging arm 74 and the fork-shaped element 39.

The ribbon-like manufactured article 26, which has been deprived of the film 30 in the manner better clarified in the following, is then engaged, after passing over an idler roller 76 carried by the lifting lever 40, between a pair of opposite take-up rollers 77 operable in rotation by a driving wheel 78 rotated through the movement of the main carriage 33.

In greater detail, the driving wheel 78 is driven by a third toothed belt 79 in turn operated by a driving pulley 79a operatively connected to one of the first idler rollers controlling the movement of the main carriage 33.

In addition, the driving wheel 78 is connected to one of the take-up rollers 77 after interposing two one-way clutches 80a, 80b. The first one-way clutch 80a prevents the take-up rollers 77 from being dragged in rotation directly by the manufactured article 26, causing the unwinding of said manufactured article in the direction of the main carriage 33.

The second one-way clutch 80b, to the contrary has the function of allowing the driving wheel 78 to freely rotate without the rollers 77 being driven in rotation when the main carriage 33 moves towards the storage device 42.

As can be seen from a comparison between FIGS. 7 and 8, when the presser roller 32 is moved apart from sleeve 4, the positioning roller 73, urged downwardly by the spring 75, keeps the second ribbon-like manufactured article 26 away from the presser roller to avoid the high temperature of the latter burning the manufactured article.

When the presser roller 32 in its working condition is moved along the sleeve 4, the positioning roller 73 acts by a thrust action on the sleeve itself so that the manufactured article 26 being held by the take-up rollers 77 temporarily stationary may be unfolded on the sleeve exactly before the presser roller 32.

The passage of the presser roller 32 on the second manufactured article 26 will cause the transferring of the film 30 thereof to the sleeve 4.

Obviously by a single going stroke of the presser roller 32 the simultaneous application of the films 30 belonging to the first and second ribbon-like manufactured articles 25, 26 is carried out.

When the application has been completed and the presser roller 32 raised again from the sleeve 4 while the main carriage 33 is moved backward away from the storage device 42, there is an automatic beginning of the rotation of rollers 77, which will bring about the dragging along of the paper substrate 29 separated from the film 30 laid on the sleeve.

During this step there is also the occurrence of a spontaneous separation of the film portion 30 transferred to the sleeve 4 from the film portion still adhering to the paper substrate 30 of the manufactured article 26.

The peripheral speed of the take-up rollers 77 is substantially identical to the translation speed of the main carriage 33, so that the dragging along of the whole amount of paper substrate deprived of the transferable film 30 during the application step, is ensured.

The paper substrate unwound from the take-up rollers 77 will be heaped up in a reception container not shown as not of importance to the ends of the invention.

Simultaneously with the return of the main carriage 33, the supporting board 3 will be brought back, by movement of the post 5 on the transverse guides 6, to the loading-unloading position.

During this step, a brush 83 fastened to the framework 2 exercises a rubbing action on the sleeve 4 so as to also cause the removal therefrom of the paper substrate 29 belonging to the first ribbon-like manufactured article 25.

This paper substrate 29 will be dropped into a collection vessel 84 positioned under the brush 83.

When the supporting board 3 reaches the loading-unloading position, the transferring member 8 is operated again and it will pick up a sleeve 4 from the board 3 engaging it again onto the handling support 9.

Then the handling support 9, by operating rollers 21, will be moved away from the pause station 20 to enable the transferring of the sleeve to the apparatus designed to carry out thereon the subsequent working steps provided for the production of driving belts.

The present invention attains the intended purposes. Actually it is to be noted that the application of inscriptions to the sleeves by the process and apparatus in reference takes place in a very simple and precise manner, without involving the use of highly polluting paints and solvents which are also injurious to the health. In addition, as clearly understood from the foregoing, the process and apparatus in question enable the application of inscriptions to be carried out in a completely automated manner, bringing about savings of time and manpower.

Obviously modifications and variations can be made to the invention as conceived, all of them falling within the scope of the inventive idea.

For example, unlike the representation shown in FIGS. 4 to 9, the sleeve could be disposed so as to have its end flush with the blade 68.

In this case the closing bars 64 would lock the second end of the ribbon-like manufactured article 25 before the cutting. In particular, the simultaneous application of the films belonging to the first and second manufactured article is not to be considered as binding. In fact the apparatus of the invention can be arranged for the working being carried out exclusively on the first manufactured article. In this case the presence of rollers 71, 73, 76 and 77 designed to act on the second ribbon-like article 26 will not be necessary.

Alternatively, the apparatus can be arranged for carrying out the application of the film belonging to the second ribbon-like article 26 which is universally adopted for all types of sleeves being worked. In this case it would be possible to eliminate the storage device 42, the first and second grasping members 55, 61, the cutting member 64 and the components related thereto.

It is also to be noted that the storage device is advantageously structured so that two apparatuses can be simultaneously interlocked thereto.

To this end it is in fact sufficient to dispose the two apparatuses in mirror image relationship and supply each box 43 with two first ribbon-like manufactured articles in the form of rolls, coming out of the box according to respectively opposite directions.

On the other hand, the box system and the storage of data relating to the various customers allow a new marking operation to be immediately started should it be necessary to stop the one in progress due to irregularities of any kind.

In addition, during the marking step it is possible to act on boxes unconcerned with this step in order to carry out various different operations.

We claim:

1. An apparatus for applying identification inscriptions to elastomeric sleeves which will later be cut to form a plurality of driving belts, said apparatus comprising:
    a guide and support framework;
    a supporting board connected to said framework and positioned to support a sleeve longitudinally fitted on the board
    set up means acting on a ribbon-like manufactured article wound in a roll, said roll being adapted to longitudinally unroll and extend the manufactured article onto an outer surface of the sleeve supported on said board, said manufactured article having a paper substrate to which a transferable film is applied, said film being oriented towards the sleeve and carrying said identifying inscriptions;
    a main carriage slidably guided by the framework and longitudinally movable over the sleeve fitted on the supporting board;
    a heated presser roller rotatably supported by the main carriage on an axis at right angles to the longitudinal axis of the sleeve and mounted to act by a thrust action on the ribbon- manufactured article lying over the sleeve so that, following a movement by the main carriage, said roller may cause the transferring of said transferable film onto the sleeve surface and the simultaneous detachment of the paper substrate from said film.

2. An apparatus according to claim 1 including:
    a storage device having at least one container box aligned with the sleeve and accommodating a first ribbon-manufactured article wound in the form of a roll, said first manufactured article having an unwinding portion projecting towards the sleeve through an opening formed in the container box;
    an auxiliary carriage slidably supported by the framework and longitudinally movable over the sleeve with a stroke of greater amplitude than the length of the sleeve;
    a grasping member carried by the first auxiliary carriage to engage a first ribbon- manufactured article at the end of its unwinding portion and unroll it longitudinally onto said sleeve;
    a second grasping member acting between the sleeve and said container box for holding the first manufactured article action of the first grasping member;
    a cutting member mounted for transverse movement between the container box and the sleeve for cutting the first ribbon- manufactured article which has been unrolled on the sleeve.

3. An apparatus according to claim 2 in which said set up means further comprises a second grasping member operatively supported by a second auxiliary carriage slidably engaged to the framework to move the second grasping member from a first position in which it is slightly spaced apart from the sleeve in order to hold the first ribbon- manufactured article during the operation of the cutting member to a second position in which it is moved close to the sleeve in order to position one end of the manufactured article cut in register with one end of the sleeve.

4. An apparatus according to claim 3 in which said second grasping member comprises two closing bars slidably engaged to the second auxiliary carriage in a substantially vertical direction; at least one pinion gear rotatably supported by the second auxiliary carriage and acting on two opposed rack rods each extending at right angles from one of said closing bars; and at least a fluid-operated closure actuator acting between the second auxiliary carriage and one of the closing bars to simultaneously move the closing bars close to and away from each other.

5. An apparatus according to claim 2 in which each container box has a closure partition oscillatably hinged at the box opening, which can be moved close to one edge of said opening upon the action of a fluid-operated thrust cylinder to hold the unwinding portion of the first ribbon manufactured article between the closure partition and the edge of the opening during the operation of the cutting member.

6. An apparatus according to claim 2 in which said storage device comprises a plurality of container boxes aligned to form a plurality of horizontal rows mutually superposed and spaced apart from each other; at least one pair of handling tracks passing over respective driving wheels and oscillatably engaging the box rows; a bearing framework operatively engaging the driving wheels and movable perpendicularly to the longitudinal extension of the sleeve to selectively dispose the individual boxes before the sleeve so as to be in register with the rotational movement of the driving wheels.

7. An apparatus according to claim 6 in which at least one magnetic card is combined with said sleeve and it is positioned to be read by a reading member communicating with an electronic control unit for causing the selective positioning of the individual container boxes before the sleeve, said selective positions being based on data detected by reading said magnetic card.

8. An apparatus according to claim 1 in which said set up means comprises:
   a positioning roller carried by the main carriage slidably engaging a second ribbon manufactured article at a unwinding portion thereof extending from the roll and acting in abutment on the sleeve so as to unroll and second ribbon-manufactured article thereon, following the movement of the main carriage, the roll of the second manufactured article being rotatably supported by the main carriage;
   a pair of opposite take-up rollers operatively supported by the framework, engaging the paper substrate separated from the film which is applied to the sleeve; said rollers being operable in rotation so as to drag along said paper substrate during a return stroke of the main carriage.

9. An apparatus according to claim 8 in which said positioning roller is rotatably supported by a swinging arm operatively connected to the main carriage and a preloading spring biased to lower the positioning roller relative to the presser roller in order to move a second ribbon-manufactured article away from the presser roller when said roller is disengaged from the sleeve.

10. An apparatus according to claim 8 in which said take-up rollers are actuated by a driving wheel driven in rotation by the movement of the main carriage through a first one-way clutch prevents the rollers from being dragged in rotation by the paper substrate of the second manufactured article, and a second one-way clutch releasing the rotation of the driving wheel relative to the rollers during the movement of the presser roller on the manufactured article previously unfolded onto the sleeve.

11. An apparatus according to claim 1, in which said presser roller is rotatably supported by a lifting lever oscillatably linked to the main carriage and movable upon command of a fluid-operated lifting actuator mounted to the main carriage to move the presser roller from a rest condition in which it is raised from the sleeve to an operating condition in which it acts on the sleeve by exerting a thrust action controlled by said lifting actuator thereon.

12. An apparatus according to claim 1 further comprising: a pause station arranged to engage a handling support carrying said sleeve; a transferring member slidably supported by said framework for picking up a sleeve from the handling support and engaging said sleeve on said supporting board.

13. An apparatus according to claim 12 in which said transferring member comprises a supporting block movable along a longitudinal member carried by said framework at the upper part thereof, said block being associated with a sleeve-grasping member.

14. An apparatus according to claim 12 in which said supporting board is mounted in cantilevered fashion to an upright movable along transverse guides directed at right angles to the longitudinal extension of the board, the mounting be such as to move said board from a loading-unloading position in which it receives the sleeve in engagement upon the action of said grasping member, to a work position in which the sleeve undergoes the application of the film upon the action of the presser roller.

* * * * *